Nov. 25, 1958  K. PÄSSLER  2,861,665

MAGNETIC CLUTCHES

Filed Jan. 14, 1955

United States Patent Office 2,861,665
Patented Nov. 25, 1958

2,861,665

MAGNETIC CLUTCHES

Kurt Pässler, Berlin-Frohnau, Germany, assignor to Siemens Schuckertwerke Aktiengesellschaft, Berlin-Siemensstadt, Germany, a corporation of Germany Application January 14, 1955, Serial No. 481,923

Claims priority, application Germany February 12, 1954

5 Claims. (Cl. 192—84)

My invention relates to torque transmission devices and more particularly to electromagnetically operating clutches.

In ordinary magnetic clutches the maximum torque that can be transmitted depends both upon the area of the clutch friction plates pressed together by the attractive force of the controlling electromagnet, and the maximum value of magnetic excitation. By using laminated, interspaced clutch discs or plates, the maximum torque transmissible for a given size of the clutch can be increased, but only to a limited extent.

The principal object of my invention is to provide an improved magnetic clutch capable of transmitting much greater torque than was heretofore possible with magnetic clutches of the same size.

To achieve this improvement, and in accordance with my invention, I provide a magnetic clutch with mechanical means which derive actuating energy from the torque being transmitted to exert an auxiliary compressional force against the clutch discs in addition to the force exerted by the magnetic system. This auxiliary force becomes effective only after the magnetic clutching action first comes into play.

According to another, more specific feature of my invention, the above-described auxiliary mechanical pressure means comprise a longitudinally displaceable wedge coupling disposed in the torque transmission path between the magnetic clutch and the output shaft. One part of the wedge coupling is fixed to the output shaft and the other part is fixed to the driving member of the magnetic clutch and is longitudinally slidable on the output shaft, so that when torque is transmitted through the clutch and to the slidable part of the wedge coupling, the reaction of the slidable part of the wedge coupling against its mating fixed part will cause it, together with the driven member of the magnetic clutch, to be slidably moved in the direction of increased clutching action. As another feature of the invention I provide, in alternative embodiments of the invention, rollers or spherical bearings between the mating slidable surfaces of the wedge coupling in order to reduce friction forces to a minimum.

Other objects and features of the invention will be apparent from the following description and the embodiments of the invention shown in the accompanying drawings wherein.

Figure 1:
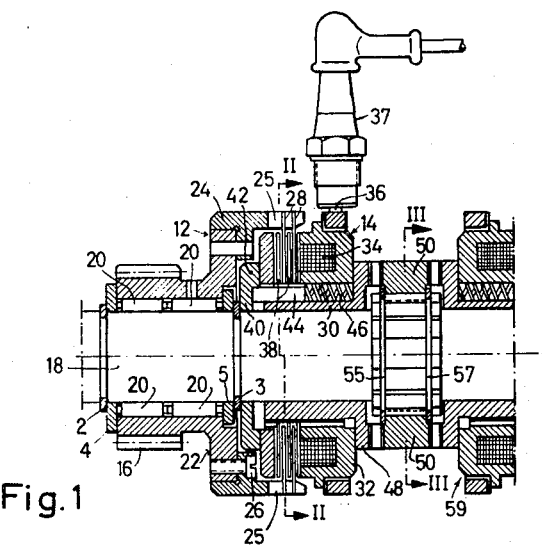
Fig. 1 is a vertical cross-sectional view of an improved magnetic clutch embodying the invention.

Referring to the drawings in detail, the illustrated clutch comprises a driving member 12 and a driven member 14. As shown in Fig. 1, member 12 is prevented from moving axially along output shaft 18 by two opposite locking collars 2 and 3 which are seated in annular grooves formed in the shaft, and are assisted by annular members 4 and 5. The driving member 12 has a power input gear 16 rotatably mounted about an output shaft 18 on roller bearings 20. The driving member 12 has an annular flange portion 22 against which an annular crown member 24 is fixed as by a plurality of bolts 26. The crown member 24 has a plurality of peripheral, equidistantly-spaced teeth 25. A plurality of spaced annular driving clutch discs 28 are provided with peripheral slots 27 for keying the discs 28 to the teeth 25 (see Fig. 2). The driving clutch discs 28 are therefore movable axially with respect to the driving member 12.

The driven member 14 of the clutch 10 comprises a bushing member 30, slidably mounted on the shaft 18 and having fixed there to an annular, magnetic structure 32 containing an electromagnetic winding 34. The electromagnetic winding 34 has one of its winding terminals connected to a slip-ring 36 mounted upon the structure 32 and insulated therefrom, and its other terminal grounded for return conduction through the clutch shaft 18. A stationary brush-holding member 37 serves to supply current to the electromagnetic winding 34 when the clutch is in operation.

Figure 2:
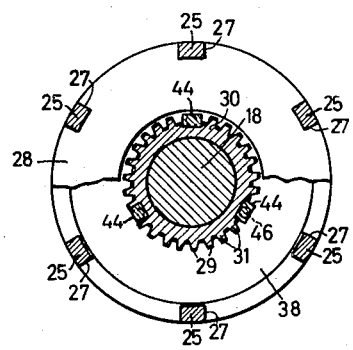
Fig. 2 is a cross-sectional view, with sections broken away, taken along the line II—II of Fig. 1.

Interspaced with respect to the driving clutch discs 28 and keyed to the bushing member 30 are a plurality of driven clutch discs 38. As best seen in Fig. 2, the bushing member 30 is provided with a plurality of peripheral teeth 31 upon which the driven clutch discs 38, having complementary slots 29 are keyed. The driven discs 38 are therefore movable axially with respect to the bushing member 30.

Rotatably mounted on the shaft 18 is an annular armature member 40 having an annular pole face portion 42 closely adjacent the outer one of the plurality of driven clutch discs 38. The armature member 40 and the magnetic structure 32 are interconnected for simultaneous rotary motion by means of a plurality of rectangular pins 44 slidable in suitable rectangular openings in the bushing member 30 and extending parallel with the axis of rotation of the output shaft 18. The armature member 40 and the magnetic structure 32 are normally urged apart in the axial direction by means of a plurality of compression springs 46, one for each pin 44, acting between the pins and the magnetic structure 32.

Figure 3:
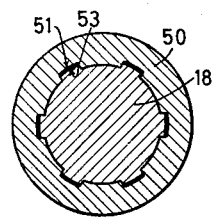
Fig. 3 is a cross-sectional view, with sections broken away, taken along the line III—III of Fig. 1.

The bushing member 30 further comprises an annular, triangular-toothed or wedged mechanical coupling member 48 cooperatively disposed with respect to a complementary coupling member 50. The coupling member 50 is keyed to the output shaft 18 by spline coupling through a plurality of annular slots 51 and splines 53 as best illustrated in Fig. 3. Axial movement of the bushing member 50 is prevented by means of locking rings 55, 57 (see Fig. 1).

Figures 4, 5, 6, 7:
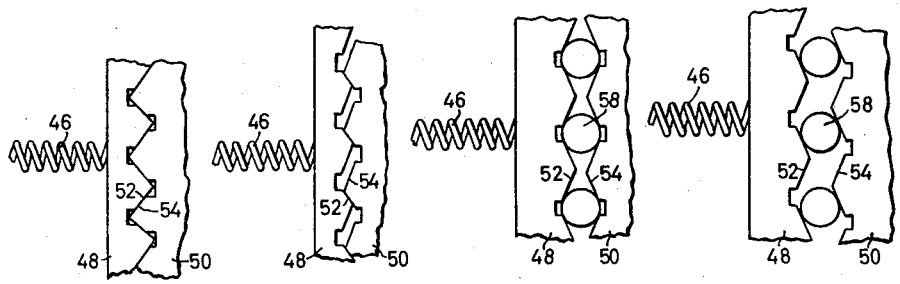
Fig. 4 is a partial view, on an enlarged scale, of the annular triangular tooth or wedge coupling shown in rest position.
Fig. 5 is a view similar to Fig. 3 but showing the wedge parts in actuated position.
Figs. 6 and 7 are similar to Figs. 4 and 5, respectively, and illustrate alternative embodiments of the invention wherein rollers or spherical bearings are used between the sliding surfaces of the wedge coupling to reduce friction.

The coupling members 48 and 50, as illustrated in Figs. 4 and 5, have their respective angular, planar surfaces 52, 54, in direct face-to-face engagement, the primary function of these surfaces being to cause such a reaction between the coupling members 48 and 50 upon transmission of torque that the bushing member 30 is moved axially and results in increased interfacial friction between the driving and driven clutch discs 28 and 38. Thus, when the electromagnetic winding 34 is energized, the armature member 40 will be attracted toward the magnetic structure 32 against the force of springs 46 so as to press together the interspaced driving and driven clutch discs 28, 38. The resulting frictional interengagement between the driving and driven discs will cause the driven member 14 to rotate, whereupon torque will be applied through the coupling members 48 and 50 to drive the output shaft 18. As described above, upon transmission of torque the sliding reaction between the complementary interengaging surfaces 52, 54 of the respective coupling members 48, 50 (see Fig. 5) causes the bushing member 30 to be moved axially to the left, whereupon the clutch discs 28, 38 will be pressed together with increased force to increase friction and the maximum amount of torque that can be transmitted.

In an alternative embodiment of the invention, rollers or spherical bearings 58 are used between the surfaces 52, 54 to minimize friction, this embodiment being shown in Figs. 6 and 7 wherein Fig. 6 shows the coupling at rest, and Fig. 7 in actuated condition.

As partially shown in Fig. 1, a second clutch mechanism 59 can be installed on the shaft 18 operating against the opposite side of the coupling member 50. This second clutch mechanism could alternatively supply torque having greater speed, or having opposite direction with respect to torque supplied by the first clutch.

It will be understood by those skilled in the art that the invention permits of various embodiments, modifications and uses other than those herein specifically described without departing from the essential features of the invention as set forth in the claims annexed hereto:

I claim:

1. An electromagnetic clutch apparatus for torque transmission, comprising an output shaft, a driving member mounted in axially fixed position on said output shaft and free to rotate thereon, a driven device comprising first means carrying an electromagnet winding and second means comprising an armature, both means being mounted on, free to rotate on, and axially slidable along said shaft toward and away from each other, an axially movable driving clutch disc carried by the driving member and rotating together therewith about said shaft, an axially movable driven clutch disc facing said driving clutch disc and carried by the driven device and rotating together therewith about said shaft, a resilient device normally urging the said two means of the driven device apart longitudinally of the shaft, said two means being coupled together for conjoint rotation about said shaft, the energizing of the magnet drawing one of said means toward the other and compressing the clutch discs together whereby the driven device is turned on said shaft, said driven device having a first coupling member fixed thereupon and turning freely on said shaft, a second coupling member on and connected to turn said shaft, the second coupling member being in axially fixed position, the resilient device urging the first coupling member axially toward the second coupling member, the coupling members having opposed force-transferring surfaces inclined with respect to the axis of the shaft, the transmission of torque from the first to the second coupling member through the inclined surfaces serving to force the first coupling member back along the axis of the shaft against the action of the resilient device.

2. An electromagnetic clutch apparatus for torque transmission, comprising a shaft, a driving member mounted in axially fixed position on said shaft and free to rotate thereon, a driven device comprising first means carrying an electromagnet winding and second means comprising an armature, both means being mounted on, free to rotate on, and axially movable along said shaft toward and away from each other, an axially movable driving clutch disc carried by the driving member and rotating together therewith about said shaft, an axially movable driven clutch disc facing said driving clutch disc and carried by the driven device and rotating together therewith about said shaft, a resilient device urging said first and second means of the driven device apart longitudinally of the shaft, said first and second means being coupled together for conjoint rotation about said shaft, the energizing of the magnet drawing the armature means toward the winding and compressing the clutch discs together whereby the driven device is turned on said shaft, said driven device having a first coupling member fixed thereupon, a second coupling member, the second coupling member being in axially fixed and aligned position relative to the driving member, the resilient device urging the first coupling member axially toward the second coupling member, the coupling members having opposed force-transferring surfaces inclined with respect to the axis of the shaft and forming a wedge coupling, the transmission of torque from the first to the second coupling member through the inclined surfaces serving to force the first coupling member back along the axis of the shaft against the action of the resilient means.

3. An electromagnetic clutch apparatus for torque transmission, comprising an output shaft, a driving member mounted in axially fixed position on said output shaft and free to rotate thereon, a driven device comprising first means carrying an electromagnet winding and second means comprising an armature, both means being mounted on, free to rotate on, and axially slidable along said shaft toward and away from each other, an axially movable driving clutch disc carried by the driving member and rotating together therewith about said shaft, an axially movable driven clutch disc facing said driving clutch disc and carried by the driven device and rotating together therewith about said shaft, a plurality of compression springs which when compressed normally urge said first and second means of the driven device apart longitudinally of the shaft, pins held in position by the springs to couple said first and second means for conjoint rotation about said shaft, the springs and pins being distributed about the shaft axis, the energizing of the magnet drawing the armature means toward the winding and compressing the clutch discs together whereby the driven device is turned on said shaft, said driven device having a first coupling member fixed thereupon and turning freely on said shaft, a second coupling member on and connected to turn said shaft, the second coupling member being in axially fixed position, the compression springs urging the first coupling member axially toward the second coupling member, the coupling members having opposed force-transferring surfaces inclined with respect to the axis of the shaft, the transmission of torque from the first to the second coupling member through the inclined surfaces serving to force the first coupling member back along the axis of the shaft against the action of the resilient means.

4. An electromagnetic clutch apparatus for torque transmission, comprising an output shaft, a driving member mounted in axially fixed position on said output shaft and free to rotate thereon, a driven device comprising first means carrying an electromagnet winding and second means comprising an armature, both means being mounted on, free to rotate on, and axially movable along said shaft, an axially movable driving clutch disc carried by the driving member and rotating together therewith about said shaft, an axially movable driven clutch disc facing said driving clutch disc and carried by the driven device and rotating together therewith about said shaft, a resilient device normally urging the said two means of the driven device apart longitudinally of the shaft, said means being coupled together for conjoint rotation about said shaft, the energizing of the magnet drawing the armature means toward the winding and compressing the clutch discs together whereby the driven device is turned on said shaft, said first means carrying an electromagnet winding having a first coupling member fixed thereupon and turning freely on said shaft, a second coupling member on and connected to turn said shaft, the second coupling member being in axially fixed position, the resilient device urging the first coupling member axially toward the second coupling member, the coupling members having opposed wedge-shaped force-transferring surfaces inclined with respect to the axis of the shaft, the transmission of torque from the first to the second coupling member through the inclined surfaces serving to force the first coupling member back along the axis of the shaft against the action of the resilient means.

5. An electromagnetic clutch apparatus for torque transmission, comprising an output shaft, a driving member mounted in axially fixed position on said output shaft and free to rotate thereon, a driven device comprising first means carrying an electromagnet winding and second means comprising an armature, both means being mounted on, free to rotate on, and axially slidable along said shaft toward and away from each other, stop means delimiting the extent of axial movement of the second means toward the driving member, an axially movable driving clutch disc carried by the driving member and rotating together therewith about said shaft, an axially movable driven clutch disc facing said driving clutch disc and carried by said first means of the driven device and rotating together therewith about said shaft, a plurality of compression springs which when compressed normally urge said first and second means of the driven device apart longitudinally of the shaft, pins held in position by the springs to couple said first and second means for conjoint rotation about said shaft, the springs and pins being distributed about the shaft axis, the energizing of the magnet drawing the armature means toward the winding and compressing the clutch discs together whereby the driven device is turned on said shaft, said first means carrying an electromagnet winding having a first coupling member fixed thereupon and turning freely on said shaft, a second coupling member on and connected to turn said shaft, the second coupling member being in axially fixed position, the compression springs urging the first coupling member axially toward the second coupling member, the coupling members having opposed force-transferring surfaces inclined with respect to the axis of the shaft and comprising wedge-shaped teeth, rollable bodies between the surfaces, the transmission of torque from the first to the second coupling member through the inclined surfaces and rollable bodies serving to force the first coupling member back along the axis of the shaft against the action of the resilient means.

References Cited in the file of this patent

UNITED STATES PATENTS

| | | |
|---|---|---|
| 942,187 | Ravenshaw | Dec. 7, 1909 |
| 1,628,184 | Pestel | May 10, 1927 |
| 1,787,225 | Wittkuhns | Dec. 30, 1930 |
| 1,891,982 | Hodgson | Dec. 27, 1932 |
| 2,038,182 | Linder | Apr. 21, 1936 |
| 2,091,270 | Colman | Aug. 31, 1937 |
| 2,721,639 | Miller | Oct. 25, 1955 |
| 2,605,877 | Winther | Aug. 5, 1952 |

FOREIGN PATENTS

| | | |
|---|---|---|
| 536,334 | Great Britain | May 12, 1941 |